US007836497B2

(12) United States Patent
Hossain et al.

(10) Patent No.: US 7,836,497 B2
(45) Date of Patent: Nov. 16, 2010

(54) APPARATUS AND METHOD FOR RESILIENT IP SECURITY/INTERNET KEY EXCHANGE SECURITY GATEWAY

(75) Inventors: Mahmood Hossain, Cary, NC (US); James Comen, Raleigh, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 979 days.

(21) Appl. No.: 11/615,852

(22) Filed: Dec. 22, 2006

(65) Prior Publication Data
US 2008/0155677 A1 Jun. 26, 2008

(51) Int. Cl.
 *G06F 15/16* (2006.01)
(52) U.S. Cl. ................. 726/15; 726/1; 726/13; 726/14
(58) Field of Classification Search ........... 726/15
See application file for complete search history.

(56) References Cited

U.S. PATENT DOCUMENTS

| | | | |
|---|---|---|---|
| 2002/0080752 A1* | 6/2002 | Johansson et al. | 370/338 |
| 2003/0191963 A1* | 10/2003 | Balissat et al. | 713/201 |
| 2007/0016947 A1* | 1/2007 | Balissat et al. | 726/15 |
| 2007/0169187 A1* | 7/2007 | Balissat et al. | 726/15 |
| 2007/0186281 A1* | 8/2007 | McAlister | 726/14 |
| 2008/0016550 A1* | 1/2008 | McAlister | 726/1 |
| 2008/0075088 A1* | 3/2008 | Carrasco | 370/395.5 |
| 2008/0155676 A1* | 6/2008 | Johnson et al. | 726/13 |
| 2008/0155677 A1* | 6/2008 | Hossain et al. | 726/15 |
| 2008/0155678 A1* | 6/2008 | Ohkubo et al. | 726/15 |
| 2008/0172582 A1* | 7/2008 | Sinicrope et al. | 714/48 |
| 2008/0192930 A1* | 8/2008 | Balissat et al. | 380/255 |
| 2008/0301797 A1* | 12/2008 | Mathai et al. | 726/12 |

OTHER PUBLICATIONS

Knight D. Weaver Ascend Communications S et al: "Virtual Router Redundancy_Protocol; draft-ietf-vrrp-spec-01.txt", Jul. 28, 1997.*
Kent K Seo BBN Technologies S: "Security Architecture for the Internet Protocol; rfc4301.txt", Dec 1, 2005.*
Devarapalli Nokia R Wakikawa Wide P Thubert Cisco V: "Local HA to HA protocol; draft-devarapalli-mip6-nemo-local-haha-01.txt", Mar. 5, 2006.*
Jahanzeb Faizan Hesham El-Rewini Southern Methodist University Mohammad Khalil Nortel Networks: "Virtual Home Agent Reliability Protocol (VHAR); draft-jfaizan-mipv6-vhar-01.txt", Feb. 1, 2004.*
R. Hott, "Timer Enhancements to Reduce Failover Times for the Virtual Router Redundancy Protocol for IPv4," draft-ietf-vrrp-ipv4-timers-02.txt, Internet-Draft, Mar. 6, 2006.

(Continued)

*Primary Examiner*—Kambiz Zand
*Assistant Examiner*—Yonas Bayou

(57) ABSTRACT

A method and apparatus adapting a Virtual Router Redundancy Protocol (VRRP) between a set of physical SEGs that realize a V-SEG function towards a remote IPsec/IKE peer. In tandem with the VRRP, a new protocol, referred to herein as the IPsec/IKE SA Transfer Protocol (SATP), is introduced to exchange IKE and IPsec SA information between VRRP capable SEGs. SATP synchronizes all participating SEGs with respect to dynamic IPsec state information in near real time. Thus, in the event of a master VRRP SEG failure, one of the hot-standby SEGs takes over the V-SEG function. This allows the V-SEG function to remain functional despite the possible failure of one or more participating SEGs.

19 Claims, 3 Drawing Sheets

OTHER PUBLICATIONS

C. Kaufman, "Internet Key Exchange (IKEv2) Protocol," rfc4306.txt, Network Working Group, Request for Comments: 4306, Dec. 2005.

S. Kent, "IP Authentication Header," rfc4302.txt, Network Working Group, Request for Comments: 4302, Dec. 2005.

S. Kent, "IP Encapsulating Security Payload (ESP)," rfc4303.txt, Network Working Group, Request for Comments: 4303, Dec. 2005.

S. Kent, et al., "Security Architecture for the Internet Protocol," rfc4301.txt, Network Working Group. Request for Comments: 4301, Dec. 2005.

R. Hinden, "Virtual Router Redundancy Protocol for IPv6," draft-ietf-vrrp-ipv6-spec-07.txt, Internet Draft, Sep. 28, 2004.

R. Hinden, "Virtual Router Redundancy Protocol (VRRP)," rfc3768.txt, Network Working Group, Request for Comments: 3768, Apr. 2004.

G. Huang, et al., "A Traffic-Based Method of Detecting Dead Internet Key Exchange (IKE) Peers," rfc3706.txt, Network Working Group, Request for Comments: 3706, Feb. 2004.

Knight D. Weaver Ascend Communications S et al. Virtual Router Redundancy Protocol—Jul. 28, 1997, pp. 3-9; 21-23.

Devarapalli Knoia R. Wakikawa Wide P. Thurbert Cicso V: "Local Ha to HA Protocol"—Mar. 5, 2006—p. 3, pp. 6-7.

Jahanzeb Faizan Hesham El-Rewini Southern Methodist University Mohammad Khalil Nortel Networks: Virtual Home Agent Reliability Protocol (VHAR)—Feb. 1, 2004; pp. 4-7 p. 19.

* cited by examiner

APPARATUS AND METHOD FOR RESILIENT IP SECURITY/INTERNET KEY EXCHANGE SECURITY GATEWAY

BACKGROUND OF THE INVENTION

The present invention relates to Internet security mechanisms. More particularly, and not by way of limitation, the present invention is directed to a system and method for securing Internet communications using a resilient IP security/Internet key exchange security gateway.

Abbreviations used herein shall have the following meanings:
B-SEG—Backup SEG
IKE—Internet Key Exchange
IP—Internet Protocol
IPsec—IP Security
M-SEG—Master SEG
PAD—Peer Authentication Database
SA—Security Association
SAD—Security Association Database
SADRRQ—SAD Recovery Request
SADRRP—SAD Recovery Reply
SADBRQ—SAD Build Request
SADBRS—SAD Build Response
SADBAck—SAD Build Acknowledgement
SATP—SA Transfer Protocol
SAURP—SA Update Reply
SAURQ—SA Update Request
SEG—Security Gateway
SPD—Security Policy Database
VID—Virtual SEG ID
VIP—Virtual IP
VMAC—Virtual MAC
VRRP—Virtual Router Redundancy Protocol
V-SEG—Virtual Security Gateway State-of-the-art IPsec protocols add origination-authentication and content-confidentiality of the IP packets to existing IP version 4 and IP version 6 standards using standardized data authentication and encryption algorithms. IPsec protection can be established between two end hosts to secure their communication channel and also between two SEG nodes to secure inter-network traffic traversing over an inherently insecure network. In both cases, end-to-end IPsec protection depends on establishment of unidirectional security associations (SA) at each peer node. At minimum, these SAs can be pre-configured manually, which does not scale well. To ease configuration issues and to protect the encryption keys in a scalable deployment, an IKE implementation is normally deployed together with an IPsec function. IKE allows for SAs between each peer node to be described beforehand, allowing the actual establishment of the IPsec SA to be deferred until traffic is exchanged. Time and byte limits can be imposed on the IPsec SA, limiting the amount of traffic for which single keys are used. Once these limits expire, IKE renegotiates the IPsec SA with its peer, and generates brand new keys for IPsec encryption and authentication.

When an IPsec/IKE enabled SEG crashes, all IPsec SAs, created dynamically via IKE, become unusable. Disadvantageously, there exists no mechanism to maintain existing IKE and IPsec SAs when one of the devices that negotiated them fails. There exists no resiliency mechanism for IKE. As a result all such SAs are deleted and renegotiated (if possible).

FIG. 1 illustrates IPsec/IKE 100 between 2 SEGs 101, 102. Assume two IPsec/IKE peers, SEG Node A (SEG-A) 101 and SEG Node B (SEG-B) 102, have negotiated an IKE SA and at least one child IPsec SA between them. If SEG-B 102 fails, SEG-A 101 does not immediately detect the failure, and as such, SEG-A 101 will continue to send data to SEG-B 102. Because SEG-B 102 has failed, it does not receive that data, thus all packets sent on the IPsec SA by the SEG-A 101 are black-holed. When this situation occurs, there are currently several possible subsequent events:

(1) SEG-B 102 does not restart;
(2) SEG-B 102 restarts and SEG-A 101 does not have a dead peer detection scheme; or
(3) SEG-B 102 restarts and SEG-A 101 has a dead peer detection scheme.

If SEG-B 102 does not restart, SEG-A 101 cannot communicate with SEG-B 102 and encrypted communication will stop. Upon IPsec SA expiration, SEG-A 101 is unable to negotiate a replacement IPsec SA. In this case, encrypted traffic between SEG-A 101 and SEG-B 102 completely stops.

If SEG-B 102 restarts, but SEG-A 101 does not have a dead peer detection scheme, SEG-A 101 will have to wait until the IKE SA on SEG-A 101 to SEG-B 102 times out, which could be hours or even days. Upon the expiration of the IKE SA on SEG-A 101, SEG-A 101 will delete all child IPsec SA(s) and the IKE SA. Then, SEG-A 101 can renegotiate an IKE SA and child IPsec SA and encrypted traffic can resume. In this case, encrypted traffic could be interrupted for hours or days.

If SEG-B 102 restarts and SEG-A 101 has a dead peer detection scheme, SEG-A 101 will learn about the failure of SEG-B 102 within a shorter period of time (seconds to minutes). Once SEG-A 101 has determined that SEG-B 102 has failed, SEG-A can delete its child IPsec SAs and parent IKE SA towards SEG-B 102. Then, SEG-A 101 can renegotiate an IKE SA and associated child IPsec SAs. As a result, encrypted traffic can resume. In this case, encrypted traffic could be interrupted for almost a minute or minutes.

It would be advantageous, in a high-availability deployment scenario, to have a network based resilient IPsec/IKE method and apparatus in which an IPsec/IKE peer may stop functioning but encrypted traffic is impacted minimally if at all. The present invention provides such a system and method.

BRIEF SUMMARY OF THE INVENTION

The present invention involves virtualization of the IPsec/IKE function of a physical SEG primarily to decouple its function from the physical node and introduces a network-based resiliency scheme of this V-SEG function implemented by a set of cooperating physical security gateways.

A method to accomplish the foregoing, and the apparatus implementing the method, requires adaptation of the VRRP between a set of physical SEGs that realize a V-SEG function towards a remote IPsec/IKE peer. In tandem with VRRP, a new protocol, referred to herein as the IPsec/IKE SA Transfer Protocol (SATP), is introduced to exchange IKE and IPsec SA information between VRRP capable SEGs. SATP synchronizes all participating SEGs with respect to dynamic IPsec state information in near real time. Thus, in the event of a master VRRP SEG failure, one of the hot-standby SEGs takes over the V-SEG function. This allows the V-SEG function to remain functional despite the possible failure of one or more participating SEGs.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

Figure 1:
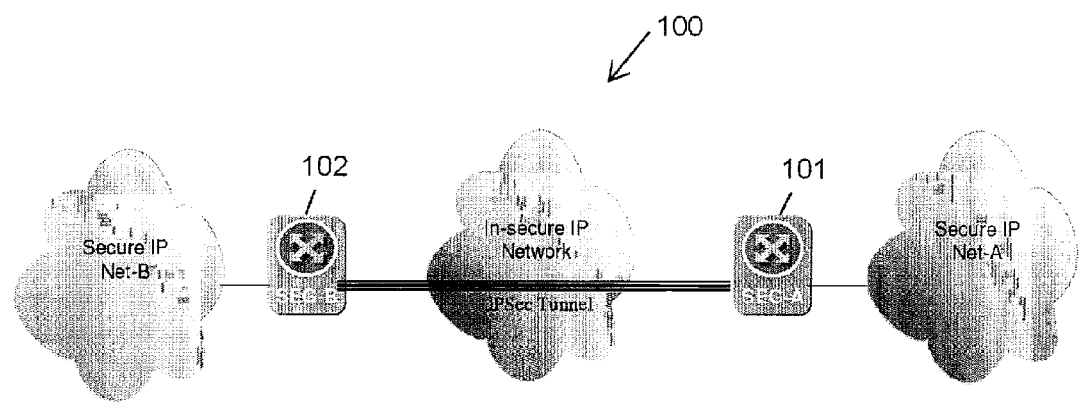
FIG. 1 illustrates IPsec/IKE between two SEGs as state-of-the-art.

The present invention comprises a first mechanism that provides a physical SEG node redundancy that is realized by a virtual IP address redundancy of a SEG and a second mechanism adapted to provide session resiliency for the on-going SAs. While the second mechanism provides an IPsec/IKE session resiliency, it uses the first mechanism for master failure detection and IP address take-over by the backups. The two mechanisms are described below.

V-SEG Failure Detection and Recovery

V-SEG failure detection and recovery is the redundancy of the physical SEG, identified by a VIP associated with the V-SEG function. From the remote peer IPsec/IKE SEG node's perspective, the VIP address must always be reachable irrespective of a particular physical SEG node failure. This requires at least a backup SEG node to take-over the VIP address when the primary SEG node fails. The present invention uses VRRP between the master and backup SEG nodes. A set of cooperating SEGs attached on a LAN segment runs the VRRP protocol to provide uninterrupted and transparent V-SEG services towards remote IPsec/IKE peers. The V-SEG is defined with three parameters: (1) a VIP address, (2) a VMAC address, and (3) a virtual SEG ID. The master SEG node owns the V-SEG function and uses the <VIP address, VMAC address> pair, while peering with the remote IPsec/IKE nodes. In case of a master SEG failure, this <VIP address, VMAC address> pair is taken-over by the backup SEG. The standard VRRP uses seconds as the granularity of time for master failure detection, which is carried in an advertisement interval (Adver Int) field of every VRRP packet, expressed in number of seconds. In adapting VRRP for V-SEG failure detection and recovery as described herein, the present invention uses the Adver Int field's value in milliseconds. The specific adaptation of VRRP, is referred to herein as the sub-second VRRP.

Fail-Over Protection of SA Database

Fail-over protection of SA database ensures that the established IKE and IPsec SAs are maintained during a master SEG failure in addition to the availability and reachability of the V-SEG function. This capability provides the full redundancy of V-SEG services. The present invention, comprising the virtualization of IPsec/IKE function along with session resiliency, is transparent to the remote IPsec/IKE peer node.

Virtual Security Gateway (V-SEG)

A V-SEG is defined using a vector <VIP address, VMAC address, VID>, which is to how a Virtual Router is defined according VRRP, where VID is a VRRP group number between 0-255. Two or more SEG nodes are configured on a local subnet and they form a VRRP group, with priorities between 0-255. The SEG node with the highest priority is the potential owner of the V-SEG function. The <VIP, VMAC, VID> vector is not owned by any particular SEG node to start with. All participating SEG nodes undergo a master election process. The SEG node with the highest priority claims the master role (M-SEG) and the others delegate themselves to backups (B-SEG). The M-SEG will automatically assume the role of V-SEG including ownership of <VIP, VMAC, VID>.

The M-SEG and all the B-SEGs are configured with the same set of static parameters required for the V-SEG function as described below.

Virtual Security Gateway Configuration

There are two types of information which must be synchronized between the M-SEG and all participating B-SEGs. Static information, from configuration files and user interaction, and learned information, as described below. Static configuration constitutes entries of SPD and PAD. The M-SEG and all the B-SEGs are configured with the same set of static parameters required for the V-SEG function: (a) SPD entries, and (b) PAD entries. This provides the necessary set-up for the VRRP-capable SEGs consisting of one M-SEG and one or more B-SEGs to participate in SATP in order to provide redundancy for the V-SEG function. Specifically, at startup time, any IKE or IPsec configuration applied to the M-SEG VRRP master node must be synchronized with that on each B-SEG node. One way to ensure this to have a common configuration file that is shared among all member SEGs. Similarly, when a user modifies configuration information of the V-SEG function on the M-SEG node there must be a manual or administrative interface to synchronize that configuration to all B-SEG nodes. This will cause both the SPD and PAD on the B-SEGs to remain current with that of the M-SEG. There are conventional methods of synchronizing these two configuration database entries among a set of SEGs participating in V-SEG function and thus are not considered herein.

Virtual Security Gateway Sessions Resiliency

The only dynamic or learned configuration information that any IPsec implementation maintains in its SAD are IPsec SAs created by IKE, in addition to manually configured IPsec SAs. The present invention extends the SAD scope to include IKE SAs. This is a database which contains manual IPsec SAs at system start-up and is populated by learned IKE and IPsec SAs.

The essential mechanics of synchronization of SAD entries among all SEGs is accomplished by running the SATP between the SEGs. For the resiliency and recovery of an SA database serviced by V-SEG, SATP defines the following seven messages between the M-SEG and B-SEGs:

1. SA Update Request—SAURQ
2. SA Update Reply—SAURP
3. SAD Recovery Request—SADRRQ
4. SAD Recovery Reply—SADRRP
5. SAD Build Request—SADBRQ
6. SAD Build Response—SADBRS
7. SAD Build Acknowledgement—SADBAck It is conventionally known that SATP messages can be protected by pre-configured static IPsec tunnels using a multicast SA or unicast SA.

Periodic SA Updates—SA Update Request message (SAURQ)

The purpose of a SAURQ message is to keep all B-SEGs synchronized with the M-SEG with respect to SA entries. The SAURQ message contains the following dynamic parameters:

Message number
SA ID {SPI Value, Remote Peer ID, Local Peer ID}
Message type {add|delete|update}
SA type {IKE, IPsec-AH, IPsec-ESP}
Delete contents {Empty}
Update contents {packets sent, packets received, Sequence number (if SA type=IPsec), Last use time (if SA type=IKE)}
Add contents {IKE {Cookies, Number of negotiations, Max byte count, Max time count Creation time, Cipher key, Cipher key length, Skeyid(s), Cipher initialization vector, Cipher initialization vector length, Retry limits, Encryption algorithm name, Authentication algorithm name, Pseudo random function (prf) algorithm name} IPsec {Reply on/off, Perfect forward secrecy (Pfs) on/off, Initiator on/off, Mode {tunnel|transport} Inform peer on/off, Inform IPsec on/off, Pfs group, SPI to, SPI from, Source traffic selector, Destination traffic selector, Authentication key, Authentication key length, Encryption key, Encryption key length, Parent IKE SA,}

The SAURQ message works as follows: as soon as an IKE or IPsec SA is negotiated or deleted or a periodic update timer has expired, the M-SEG that currently owns the V-SEG function must update all other B-SEGs with the SA (for create and delete case) and SA information if a periodic timer expires. The M-SEG node sends a SAURQ message containing all the required parameters of the SA(s). This causes the SA database on the B-SEGs to remain current with that of the M-SEG. Finally, the B-SEGs take actions based on the receipt of the SAURQ updates, including, but not limited to installing an SA in hardware, or applying a cryptomap to an interface.

The SAURQ message is sent as a multicast message addressed to the all-SEG multicast address dedicated for the V-SEG group. For example, an all-SEG multicast address can be formulated as 224.x.y.<VID>, where the last octet of the multicast address is the VID. In the implementation of the present invention, an all-SEG multicast address is reserved and the last octet of that address is used to express the <VID>. Each participating SEG node must join the corresponding all-SEG multicast group identified by the last octet of the multicast address, which is equal to the VID of the V-SEG. This SA-update message ensures that the SA databases in all the B-SEGs are synchronized in real-time with that of the M-SEG. A B-SEG, upon receiving an SAURQ message, will respond to the M-SEG with an SAURP message which serves to acknowledge receipt of the SAURQ message.

In accordance with the teachings of the present invention, if the M-SEG node fails, the B-SEGs will detect this failure via the sub-second VRRP. The B-SEGs will rapidly select a new M-SEG based on the configured VRRP priority. The new M-SEG will already be in synch with the failed M-SEG with respect to SA databases (IKE and IPsec SAs), up until the point of failure or at least to the last SAURQ message with the highest message identification. The new M-SEG assumes the new V-SEG role, taking the ownership of <VIP, VMAC> of the V-SEG and acting as the new M-SEG.

Messages Enabling a Restarted SEG to Select a Suitable Partner SEG for SA Database Recovery When a failed SEG node (the previous M-SEG) is operable again, it restarts. As soon as it restarts, it must set a special flag, such as a synch flag, to false because its non-persistent SA database is lost due to the failure and it has yet to rebuild its database from the current M-SEG or any other surviving B-SEGs. The synch flag, when set to true, indicates that the B-SEG is synchronized with M-SEG on a periodic basis. The re-started SEG also sets itself as B-SEG. Note that every other SEG node (either M-SEG or B-SEG) that is already in synch has its synch flag set to true. To rebuild its lost SA database, the newly (re)started B-SEG searches for a surviving SEG other than the M-SEG. This is to relieve the current M-SEG from the overhead of re-synchronization and allow it to handle V-SEG functions towards the peer IPsec/IKE nodes. It is noted that a newly started SEG and restarted SEG follow a similar initialization process.

The restarted SEG selects a potential partner to rebuild its lost SAD. Manually configured entries in the SAD will be synchronized via other methods. As previously mentioned, the SPD and PAD, being statically configured, will be synchronized via other methods. SATP defines the following two additional messages: SAD Recovery Request—SADRRQ, and SAD Recovery Reply—SADRRP. The restarted B-SEG sends a SADRRQ discovery request as a multicast packet addressed to the all-SEG multicast address. All surviving SEG nodes having a synch flag set to true, including the current M-SEG, respond to this discovery request by sending a unicast SADRRP reply to the requesting B-SEG indicating its priority (VRRP priority of the responding SEG). The requesting B-SEG (which is the restarted B-SEG) must select a SEG node with the lowest priority with which to synchronize its SAD. If no B-SEG is available, the current M-SEG is selected. The SADRRQ message format is a simple request and the SADRRP message format is similar to SAURP.

Messages Enabling Restarted SEG to Recover SA Database

SATP also defines the following 3 messages to be used between the restarted SEG and the selected SEG to help recreate its lost SA database: SADBRQ, SADBRS and SADBAck. As noted herein, the restarted B-SEG will initiate a SADBRQ request to the selected local SEG node. In response to this request, the chosen SEG node (either a B-SEG, if it exists and is fully synchronized otherwise the M-SEG) will send a series of SADBRS messages containing as many SA entries as can be accommodated within a single message, which is constrained by the MTU of the logical/physical link, until there are no more entries in its database. In return, the restarted B-SEG will acknowledge each SADBRS message with a corresponding SADBAck message, thereby acknowledging the receipt of the given number of SA entries. The first SADBRS message must contain an indicator flag indicating that it is the first of a series of such messages. The last SADBRS message must contain another indicator flag indicating the end of database transfer. Once the entire SA database is received, the restarted B-SEG resets its synch flag to true again.

During the SA database transfer, the restarted B-SEG may receive SAURQ messages from the current M-SEG as new SAs are created/deleted or refreshed. The restarted B-SEG, while in the process of rebuilding its lost SA database, must respond to these live updates by appropriately accepting and marking those entries as the latest. The SADBRQ message format is a simple request, the SADBRS is similar to SAURQ but may contain multiple SA entries and the SADBAck is a simple acknowledgement.

Impacts on IPsec/IKE Peer Due to V-SEG Switchover

Because IKE and IPsec timeouts are much greater than the VRRP timeouts a VRRP switchover has minimal effect. As noted above, SATP periodically updates backup SEGs with the state of the M-SEG in near real-time. This includes counts and sequence numbers of packets periodically sent and received, typically at the granularity of VRRP timers. Hence, when a B-SEG takes over for a failed M-SEG, it does so with the data from the latest SAURQ message. Thus, when the new M-SEG responds to the communicating IPsec/IKE peer, it may be out of date by the amount of the sub-second switchover time and may trigger an anti-replay alarm. However, the switchover will not cause communication to stop.

Note that the active IKE peer will continue sending data during the M-SEG failure and subsequent switchover of V-SEG function to a B-SEG. Depending on: the time period for the switchover, the speed of the link, and the amount of data sent by IKE peer, there could be a large number of packets sent from a peer addressed to a V-SEG while the VRRP switchover is taking place. Once a B-SEG fully assumes the V-SEG identity and associated function, the anti-replay function of IPsec will show that the remote IPsec peer may be significantly ahead of the V-SEG in packets sent. If an IPsec payload packet is deemed to be outside of the anti-replay window, it will be rejected by the receiver. Due to this, an upper layer e.g., IPsec payload protocol, will attempt to retransmit the payload packet. The following two scenarios illustrate the peer behavior during a V-SEG switchover.

V-SEG-B VRRP Switchover During Active Traffic from SEG-A to V-SEG-B

Figure 2:
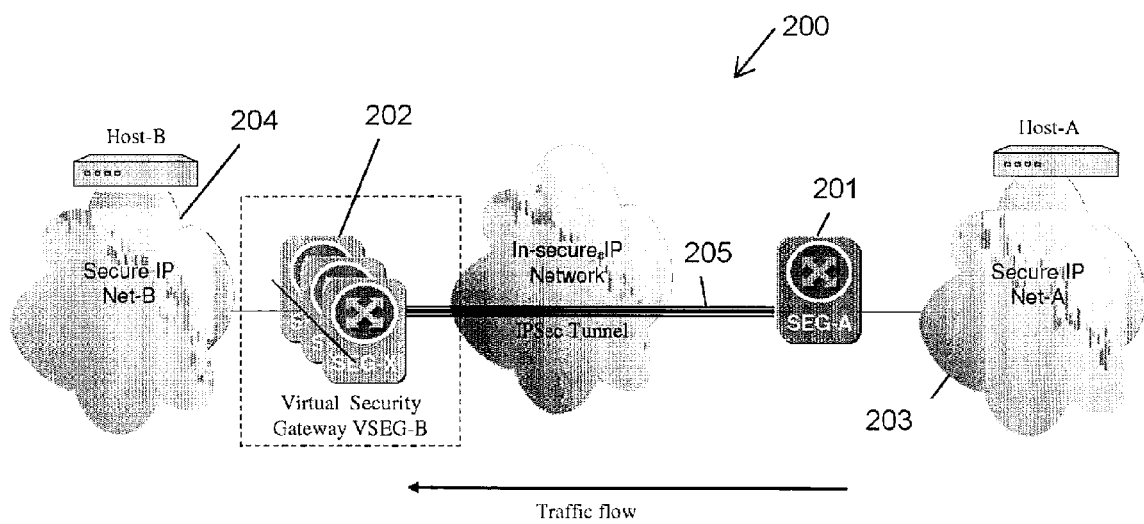
FIG. 2 illustrates secure traffic between Net-A and Net-B over an IPsec tunnel between SEG-A and SEG-B.

FIG. 2 illustrates traffic between secure Net-A 203 and Net-B 204 over IPsec tunnel 205 between SEG-A 201 and V-SEG-B 202. In this scenario, peer hosts from Net-A 203 and Net-B 204 are running a reliable protocol that requires mutual acknowledgements. When the M-SEG node (V-SEG-B) fails, a VRRP switchover occurs whereby one of the most preferred B-SEGs assumes the V-SEG function. During this VRRP switch-over time, which is less than 1 second for sub-second VRRP (although there is some application packet loss which is IPsec protected), the retransmission of the reliable protocol between Net-A 203 and Net-B 204 will prevent the two IKE peers from getting too far out of synchronization.

In the arrangement of FIG. 2, a sending IPsec peer adds a sequence number to each packet in IPsec protected traffic. An IKE negotiated IPsec SA can be configured to allow the receiving peer to check for packet replay attacks using the received sequence number. This involves determining whether a received packet falls within a sliding window. As IPsec protected packets are received, if a received packet falls outside of the anti-replay window, an anti-replay alarm is generated and, at a minimum, the received packet is dropped.

During a steady state, the upper and lower bound sequence numbers used by the receiving peer are incremented based on received packets. Within SATP, when a new M-SEG takes over, it does so using the sequence number from the latest SAURQ message. Within SATP, during a M-SEG takeover, there may be two types of packet drops: (1) packets may be lost between the time the M-SEG fails and a new M-SEG takes over, and (2) during and after the switchover, the sequence number used by the sending peer continues to increment normally while the new, receiving M-SEG uses the sequence number from the latest SAURQ message. Depending on the amount of traffic sent during the switchover and size of the anti-replay window, the packets received by the new M-SEG may fall outside of its anti-replay window. In this case, the packets will be dropped and an alarm will be generated. Due to these two types of drops, it is assumed that upper layer protocols will note the drop and retransmit.

V-SEG-B VRRP Switchover During Active Traffic from V-SEG-B to SEG-A

This scenario is not problematic because SEG-A sees that V-SEG-B has not transmitted a packet for a short amount of time. This is an acceptable inactivity as long as the SA is still active.

Figure 3:
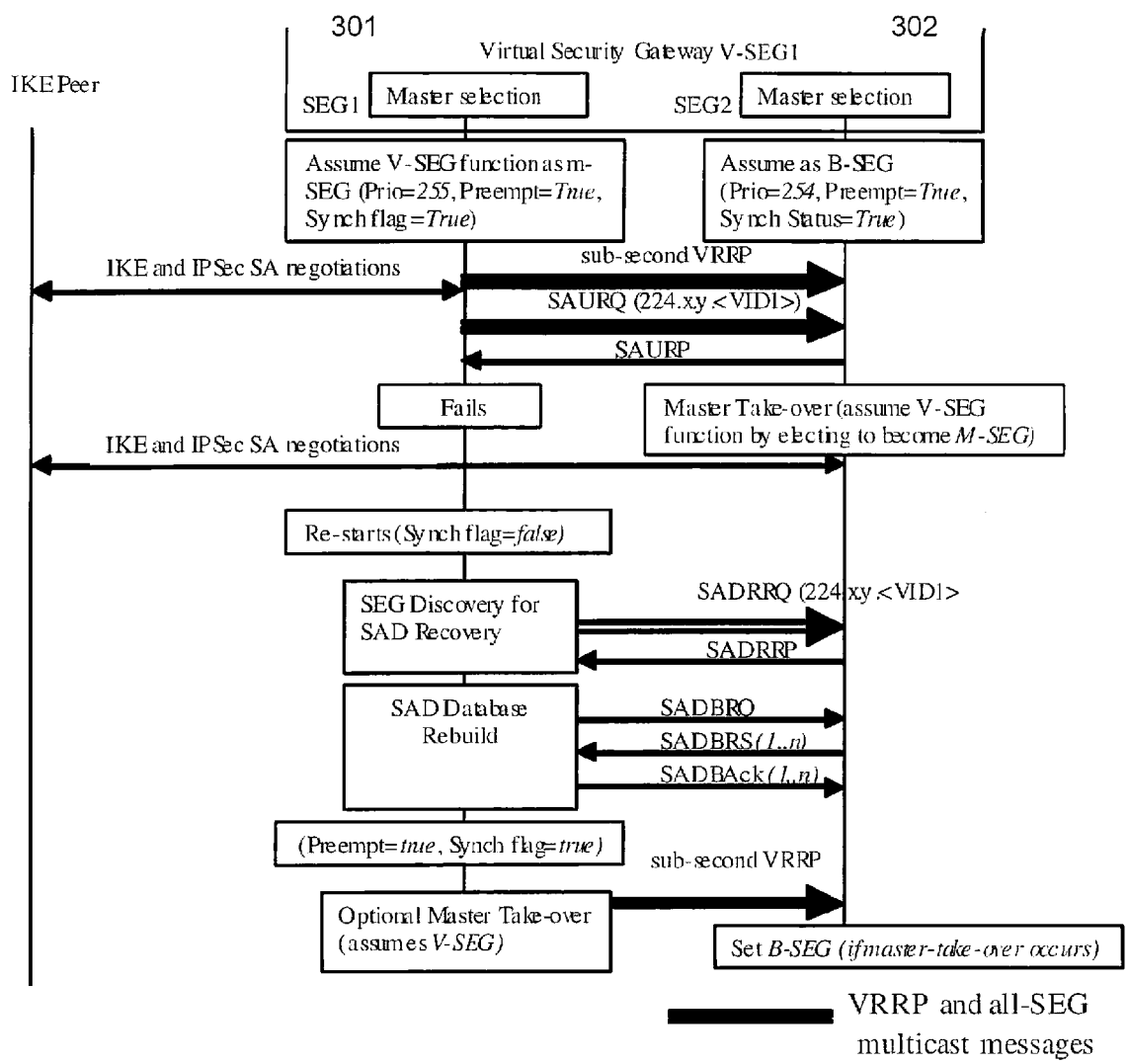
FIG. 3 illustrates V-SEG with single SEG node failure support.

Use Case Scenario-Resiliency Solution of V-SEG Function with Support for Single SEG Node Failure In this scenario, a V-SEG function, V-SEG1: <VIP1, VMAC1, and VID1> is defined. As seen in FIG. 3, a typical use-case 300 for a resilient V-SEG function identified by V-SEG1, provided by two physical SEG nodes 301, 302, is illustrated. Using SEG nodes 301, 302, only single failure cases can be handled. The proxy ARP and gratuitous ARP messages generated by the M-SEG after a successful VRRP switchover (as conventionally known) are not shown in FIG. 3.

Figure 4:
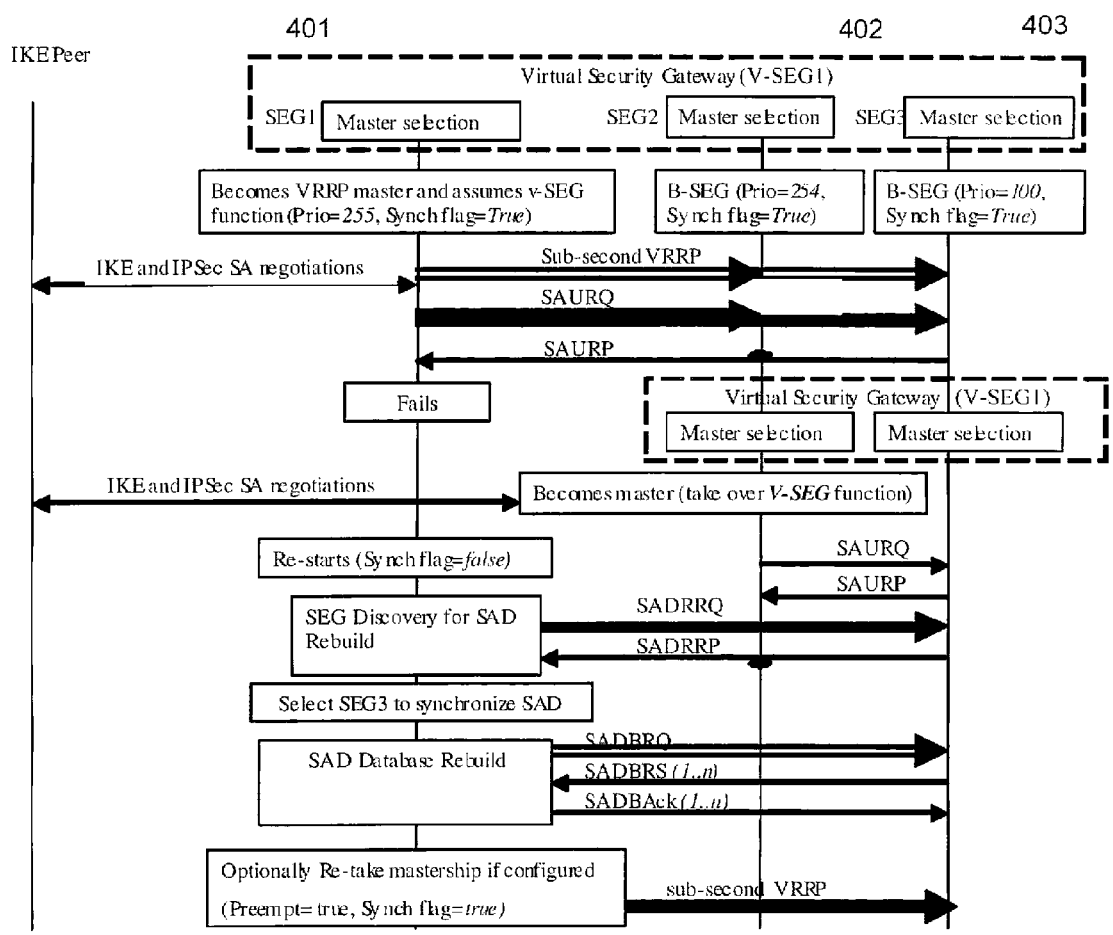
FIG. 4 illustrates V-SEG with multiple SEG nodes failure support.

Use Case Scenario-Resiliency Solution for V-SEG Function with Support for Multiple SEG Nodes Failures In this scenario, a V-SEG function, V-SEG1: <VIP1, VMAC1, and VID1> is defined. FIG. 4 illustrates a typical use-case 400 for a resilient V-SEG function identified as V-SEG1, supported by a cluster of 3 physical SEG nodes 401, 402, 403. SEG nodes 401, 402, 403 are required for handling multiple failures. The proxy ARP and gratuitous ARP messages generated by the M-SEG after a successful VRRP switchover (as conventionally known) are not shown in FIG. 4.

Use Case Scenario-Resiliency Solution Consisting of Two or More V-SEG Functions

In this scenario, two virtual V-SEGs such as V-SEG1 <VIP1, VMAC1, VID1> and V-SEG2 <VIP2, VMAC2, VID2> are defined. The use cases illustrated in FIG. 3 and FIG. 4 can easily be extended to handle resiliency of two V-SEGs (V-SEG1 and V-SEG2) using the same number of physical SEG nodes. In this case, a particular SEG node can act as an M-SEG implementing the V-SEG1 function as well as a B-SEG for the V-SEG2 function at the same time. It is also possible for a particular SEG node to act as B-SEGs or M-SEGs both for V-SEG1 and V-SEG2 functions at the same time. This is especially useful in deployments where load balancing is also achieved between two or more V-SEG functions alongside with resiliency. It is also worth mentioning here that the use of all-SEG multicast address per V-SEG functions reduces the unnecessary multicast traffic.

Advantageously, in the present invention, a remote IKE peer is unaware that it is negotiating with a VRRP router. Should a switchover occur, it would be fast enough that the IKE and IPsec protocols would not timeout. If the VRRP master router were to fail, a backup VRRP router would take over. The time elapsed between a master router failing and a backup router taking over as a master router is typically less than one second. The elapsed time is made up of: the time for VRRP to recognize that the master has failed; and the time for VRRP to elect a new master from the backups. The only impact an IKE peer router would notice would be that the remote IKE peer (here, the VRRP router) would seem unresponsive for a short time, shorter than any protocol timeout. The assumption of the virtual router identity would occur seamlessly and be unnoticed by communicating peers.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of obtaining and maintaining a resilient Internet Protocol (IP) Security (IPsec) and Internet Key Exchange (IKE) security gateway (SEG), comprising the step of:

in a set of cooperating physical security gateways, implementing a network-based resiliency scheme of a virtual SEG(VSEG) function;

virtualizing the IPsec/IKE function of the physical SEGs by adapting a virtual router redundancy protocol (VRRP) between the set of physical SEGs that realize a V-SEG function towards a remote IPsec/IKE peer; and exchanging IKE and IPsec SA information between VRRP capable SEGs using an IPsec/IKE SA Transfer Protocol (SATP), wherein the SATP is configured to synchronize all participating SEGs with respect to dynamic IPsec state information in real time.

2. The method of claim 1, wherein if a master VRRP SEG fails, one of a plurality of hot-standby SEGs takes over the V-SEG function.

3. The method of claim 1, wherein the V-SEG function is provided by a plurality of physical SEG nodes.

4. The method of claim 3, wherein the V-SEG function is provided by two physical SEG nodes.

5. The method of claim 3, wherein the V-SEG function is supported by a plurality of SEG nodes adapted to handle multiple failures.

6. The method of claim 5, wherein the V-SEG function is supported by a cluster of three (3) physical SEG nodes adapted to handle multiple failures.

7. The method of claim 3 wherein the plurality of physical SEG nodes are adapted to handle resiliency of two V-SEGs (V-SEG1 and V-SEG2) using the same number of physical SEG nodes.

8. The method of claim 7, wherein a particular SEG node is adapted to act as an M-SEG implementing a V-SEG1 function as well as a B-SEG for a V-SEG2 function at the same time.

9. The method of claim 7, wherein a particular SEG node is adapted to act as an M-SEG implementing any number of V-SEG functions as well as a B-SEG for any number of V-SEG functions at the same time.

10. The method of claim 7 wherein a particular SEG node is adapted to act as B-SEGs for V-SEG1 functions and V-SEG2 functions at the same time.

11. An apparatus to virtualize the Internet Protocol (IP) Security (IPSec) and Internet Key Exchange (IKE) (IPsec/IKE) function of a physical SEG so as to obtain and maintain a resilient IPsec/IKE security gateway (SEG), implemented using instructions on at least one node having a computer processor and non-transitory computer readable medium, comprising:

instructions loaded on the non-transitory computer readable medium for configuring a virtual router redundancy protocol NRRP) between a set of physical SEGs that realize a V-SEG function towards a remote IPsec/IKE peer: and instructions loaded on the non-transitory computer readable medium for exchanging IKE and IPsec SA information between VRRP capable SEGs using an IPsecI-IKE SA Transfer Protocol (SATP), wherein the SATP is configured to synchronize all participating SEGs with respect to dynamic IPsec state information.

12. The apparatus of claim 11, wherein if a master VRRP SEG fails, one of the hot-standby SEGs takes over the V-SEG function.

13. The apparatus of claim 11, wherein the V-SEG function is provided by a plurality of physical SEG nodes.

14. The apparatus of claim 11, wherein the V-SEG function is provided by two physical SEG nodes.

15. The apparatus of claim 11, wherein the V-SEG function is provided by any number of physical SEG nodes.

16. The apparatus of claim 11, wherein the V-SEG function identified by at least one V-SEG is supported by a cluster of three (3) physical SEG nodes adapted to handle multiple failures.

17. The apparatus of claim 11, wherein the plurality of physical SEG nodes are adapted to handle resiliency of two V-SEGs (V-SEG1 and V-SEG2) using the same number of physical SEG nodes.

18. The apparatus of claim 17, wherein a particular SEG node is adapted to act as an M-SEG implementing a V-SEG1 function as well as a B-SEG for a V-SEG2 function at the same time.

19. The apparatus of claim 17 wherein a particular SEG node is adapted to act as B-SEGs for V-SEG1 functions and V-SEG2 functions at the same time.

* * * * *

UNITED STATES PATENT AND TRADEMARK OFFICE
CERTIFICATE OF CORRECTION

PATENT NO. : 7,836,497 B2
APPLICATION NO. : 11/615852
DATED : November 16, 2010
INVENTOR(S) : Hossain et al.

It is certified that error appears in the above-identified patent and that said Letters Patent is hereby corrected as shown below:

In Fig. 3, Sheet 2 of 3, Reference lines for Tags "300", "301" and "302" are missing.

In Fig. 3, Sheet 2 of 3, below tag "300", Upper edge of the block is missing.

In Fig. 4, Sheet 3 of 3, Reference lines for Tags "400", "401", "402" and "403" are missing.

In Column 4, Line 67, delete "count Creation" and insert -- count, Creation --, therefor.

In Column 10, Line 1, in Claim 11, delete "NRRP)" and insert -- (VRRP) --, therefor.

In Column 10, Line 3, in Claim 11, delete "peer:" and insert -- peer; --, therefor.

In Column 10, Lines 6-7, in Claim 11, delete "IPsecI-IKE" and insert -- IPsec/IKE --, therefor.

Signed and Sealed this
Twenty-fifth Day of January, 2011

David J. Kappos
*Director of the United States Patent and Trademark Office*